April 6, 1937.  G. F. DURYEE  2,076,122

FLOOR COVERING

Filed July 12, 1934

INVENTOR.

GERALD F. DURYEE

BY Kwis. Hudson & Kent

ATTORNEYS

Patented Apr. 6, 1937

2,076,122

UNITED STATES PATENT OFFICE 2,076,122

FLOOR COVERING

Gerald F. Duryee, Willoughby, Ohio, assignor to The Ohio Rubber Company, Willoughby, Ohio, a corporation of Ohio Application July 12, 1934, Serial No. 734,782

1 Claim. (Cl. 154—49)

This invention relates to flexible floor coverings, and has special reference to mats for the front and rear compartments of automobiles.

More particularly, the invention relates to articles of this kind which are formed of rubber and which are known as mats or coverings of the air-cushion type.

It has been customary for a number of years for automobile manufacturers to use as floor coverings in the front and rear compartments of their cars felt back rubber mats. These mats have certain disadvantages, and, in consequence thereof, there have been developed and have gone into use more recently rubber mats of the air-cushion type, by which is meant that the under side of the mat is provided with rather deeply drawn intersecting flexible walls forming air pockets which provide a certain amount of insulation against the transmission of heat and sound and also give the mat considerable flexibility when trod upon.

Many difficulties have been encountered in the production of the air-cushion mat, as, for example, the right selection of rubber compositions for the top and bottom portions of the mat, the thickness of these portions, and especially the depth and thickness of the intersecting walls which form the air pockets. It was discovered after a great deal of experimentation that the lower portion of the mat in which the air pockets and the intersecting walls are formed and which affords flexibility should be made of soft rubber composition and that the upper or tread portion of the mat should be made of relatively hard or harder rubber composition, although the upper or top layer should have a certain degree of flexibility. Likewise, it was discovered that the proper degree or amount of cushioning action could be obtained from the relatively soft bottom layer with the intersecting pocket forming walls of given depth and thickness.

After these developments or features had been worked out, it was discovered that satisfactory mats were not being produced for different reasons, among which were the following: When the lower layer of relatively soft rubber was being forced down into the deep channels of the mold so as to form the thin intersecting walls and air pockets, some of the relatively hard rubber composition was forced down into these walls, which had a tendency to reduce their flexibility and increase the breakage factor. Additionally, it was found that where rubber from the top layer was, in the molding operation, forced down into the intersecting ribs or walls, pits or depressions were formed in the top layer. Additionally, at times some of the soft rubber composition was forced up through the upper surface of the top layer, with the result that the appearance of the mat was considerably marred, especially when the upper and lower layers were formed of rubber compositions of different colors, resulting in rejects.

I discovered that the above and certain other objections, in the form of defects in the mat or molding disadvantages, could be overcome very effectively and other distinct advantages attained by separating the upper and lower layers of rubber by a sheet of fabric, and the present invention consists in a mat or other floor covering of the air-cushion type wherein the upper and lower layers, which may be and preferably are of different compositions, are separated by a sheet of fabric which in the molding and vulcanizing operation becomes integrally united to both layers and the two layers become integrally united through the fabric without, however, the migration of any material amount of rubber from one side of the fabric to the other.

The invention may be further briefly summarized as consisting in certain novel details and features of a floor covering which will be described in the specification and set forth in the appended claim.

In the accompanying sheet of drawing.

Figure 1:
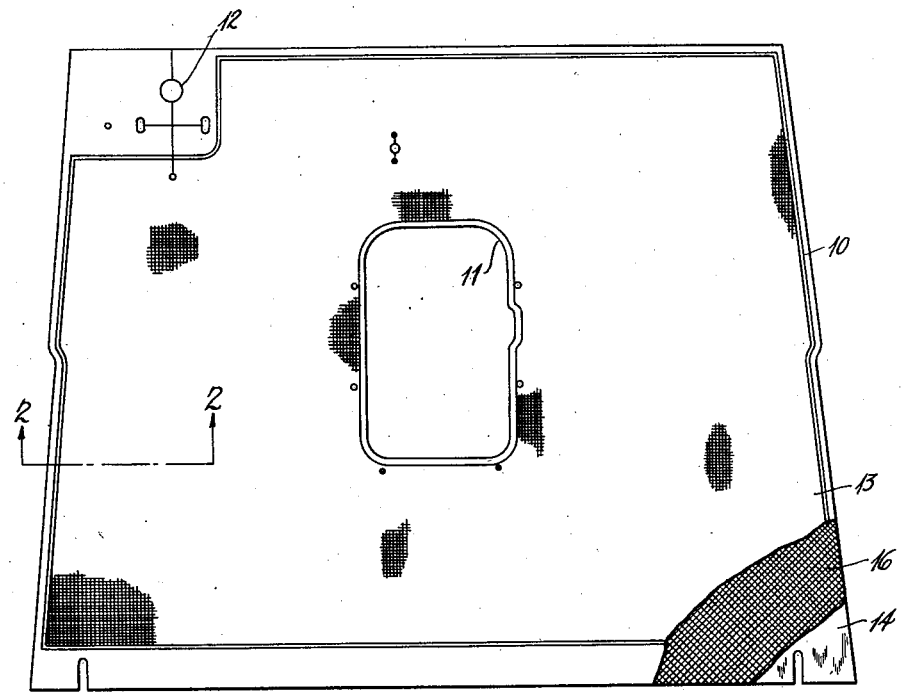
Fig. 1 is a plan view of an automobile floor mat embodying the invention, portions of the layers being broken away.
Figure 2:
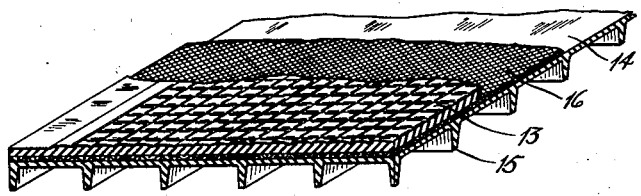
Fig. 2 is a transverse sectional view substantially along the line 2—2 of Fig. 1, with the fabric shown somewhat conventionally and of greater thickness than would actually be used in a mat of this kind.
Figure 3:
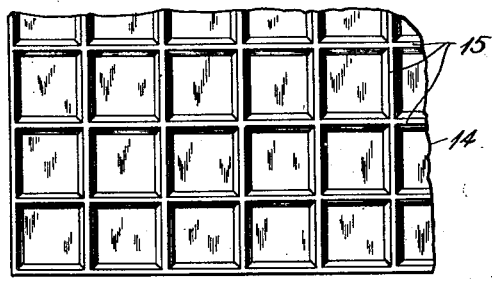
Fig. 3 is a fragmentary bottom view showing the intersecting walls and air pockets.

Referring now to the drawing, the mat 10 of Fig. 1 is a typical front compartment mat of automobiles of a certain make, this mat having a central section 11 removed to accommodate the top of the gear box or transmission. Additionally, this mat has certain openings or cutouts 12 to accommodate the various levers and control parts. However, these details are wholly immaterial to the present invention, and the mat may be otherwise formed than herein indicated. This mat is composed of a top or tread layer 13 of rubber, a lower layer 14 of relatively soft and more flexible rubber from which the deeply drawn walls 15 are formed, and an intermediate layer consisting of a sheet of fabric 16, the parts in the molding and vulcanizing operation being vulcanized into a unitary mat structure, as pointed out above.

As previously explained, the lower layer 14 of rubber is formed from soft rubber composition whereas the upper or tread layer is formed from harder or relatively hard rubber composition, in order that the mat will have the proper wearing qualities, flexibility, and cushioning effect. The sheet 16 can be formed of different kinds of fabric, either closely woven or more openly woven, but I find that ordinary burlap with its open weave gives very satisfactory results. This fabric extends over the adjoining surfaces of the two layers of rubber. In other words, it extends to the outer marginal edges of the mat and to the inner marginal edges of whatever cutouts the mat may have. I am aware of the fact that it has been proposed to embed a sheet of fabric in rubber for floor coverings, but to my knowledge an embedded fabric sheet has never been employed for the purposes herein described or for the attainment of the objects mentioned. For example, it allows the soft stock to fill the air pocket walls and prevents the harder stock from squeezing down and entering into the walls. It thereby increases the flexibility of the mat and reduces the likelihood of breakage of the lower walls which form the air pockets. Additionally, it prevents the lower stock from squeezing up through the harder stock and marring the appearance of the mat, and it prevents pitting of the upper surface of the mat, as occurs sometimes when the harder rubber composition squeezes down and enters into the walls intended to be formed by the relatively soft rubber composition. The fabric increases the tear-resisting qualities of the mat, and, for the same strength and flexibility, less rubber is required in both the upper and the lower layers than would be the case if the fabric were omitted. When pressure is placed on the mat, as when it is trod upon, the major portion of the yielding or flexibility is obtained by the bending of the intersecting walls of the bottom layer, and the upper layer is subjected to less flexing than would otherwise be the case. In other words, the fabric reduces the flexing of the upper layer, and the bottom layer performs its intended function of affording flexibility. The fabric in this instance reduces the shrinkage of the mat and allows the trimming to be accomplished while the mat is hot. Finally, it allows a greater range in the plasticity of the rubber compositions, and therefore allows a greater temperature range when the molding and vulcanizing operation is initiated. This obviously aids and simplifies manufacture.

It is to be understood that although the top or tread layer 13 is formed of harder rubber composition than the lower layer 14, both layers are formed of what is generally known as soft rubber composition, the softness of the lower layer being relative only. This is desired since the mat as a whole is flexible throughout. Furthermore, while the layers are described as being formed of rubber, it will be understood that this term is used in a broad sense as inclusive of any suitable equivalent materials which have the desired qualities or characteristics of rubber but, technically considered, may not be rubber.

While I have shown the preferred construction and have illustrated a floor covering of one type only, I do not desire to be confined to the precise structural details but aim in my claim to cover all modifications which do not involve a departure from the spirit and scope of the invention.

Having thus described my invention, I claim:

An automobile mat or other floor covering composed of upper and lower layers both of solid rubber, the upper layer being formed of relatively hard rubber composition and the lower layer of relatively soft rubber composition, said lower layer having narrow but relatively deep intersecting walls forming air pockets, and a sheet of fabric molded between the two layers so as to keep them substantially separate and to prevent material migration of rubber from one to the other during the molding and vulcanizing operation.

GERALD F. DURYEE.